United States Patent
Lee et al.

(10) Patent No.: US 9,378,583 B2
(45) Date of Patent: Jun. 28, 2016

(54) APPARATUS AND METHOD FOR BIDIRECTIONALLY INPAINTING OCCLUSION AREA BASED ON PREDICTED VOLUME

(75) Inventors: Seung Kyu Lee, Seoul (KR); Hwa Sup Lim, Hwaseong-si (KR); Kee Chang Lee, Yongin-si (KR); Do Kyoon Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1031 days.

(21) Appl. No.: 13/064,785

(22) Filed: Apr. 14, 2011

(65) Prior Publication Data

US 2012/0001902 A1 Jan. 5, 2012

(30) Foreign Application Priority Data

Jul. 2, 2010 (KR) .......... 10-2010-0063985

(51) Int. Cl.
 *G06T 15/20* (2011.01)
 *G06T 7/00* (2006.01)
 *G06T 5/00* (2006.01)

(52) U.S. Cl.
 CPC ............ *G06T 15/205* (2013.01); *G06T 5/005* (2013.01); *G06T 7/0081* (2013.01); *G06T 2207/10024* (2013.01); *G06T 2207/10028* (2013.01); *G06T 2207/20144* (2013.01)

(58) Field of Classification Search
 CPC ........ G06T 5/005; G06T 19/00; G06T 17/00; G06T 15/02; G09G 5/14
 USPC ................................................. 345/421, 441
 See application file for complete search history.

(56) References Cited

U.S. PATENT DOCUMENTS

2009/0190852 A1* 7/2009 Lim et al. ............... 382/256
2011/0080464 A1* 4/2011 Alessandrini et al. ......... 348/42

FOREIGN PATENT DOCUMENTS

JP 2000-125196 4/2000
JP 2006-302195 11/2006

(Continued)

OTHER PUBLICATIONS

Patwardhan, Kedar. Video Inpainting Under Constrained Camera Motion. 2006, IEEE.*

(Continued)

*Primary Examiner* — James A Thompson
(74) *Attorney, Agent, or Firm* — Harness, Dickey & Pierce, P.L.C.

(57) ABSTRACT

An apparatus and method for bidirectionally inpainting an occlusion area appearing during generation of a virtual viewpoint image, using a foreground area and a background area based on a predicted volume are provided. The method includes receiving an input of a depth image and a color image, the depth image having depth information for a first viewpoint, and the color image having color information for the first viewpoint, generating a virtual viewpoint image at a second viewpoint based on the depth image and the color image, separating the virtual viewpoint image into a foreground area and a background area, based on the depth information and direction information regarding a direction from the first viewpoint to the second viewpoint, predicting a three-dimensional (3D) volume of the foreground area, and inpainting an occlusion area bidirectionally using the foreground area and the background area, based on the predicted 3D volume, the occlusion area being included in the virtual viewpoint image.

30 Claims, 9 Drawing Sheets

(56) References Cited

FOREIGN PATENT DOCUMENTS

| | | |
|---|---|---|
| JP | 2009-116532 | 5/2009 |
| JP | 2009-123219 | 6/2009 |
| JP | 2010-057105 | 3/2010 |
| KR | 10-0267259 | 7/2000 |
| KR | 10-0745691 | 7/2007 |
| KR | 10-0793076 | 1/2008 |
| KR | 10-2009-0035024 | 4/2009 |
| KR | 10-0902353 | 5/2009 |
| KR | 10-2009-0082782 | 7/2009 |
| KR | 10-2010-0008677 | 1/2010 |
| KR | 10-2010-0019926 A | 2/2010 |

OTHER PUBLICATIONS

Kim et al. "A High-Quality Occlusion Filing Method Using Image Inpainting," Journal of Broadcast Engineering 15(1). 2010.

Korean Office Action dated Jan. 18, 2016 for corresponding KR Application No. 10-2010-0063985.

* cited by examiner

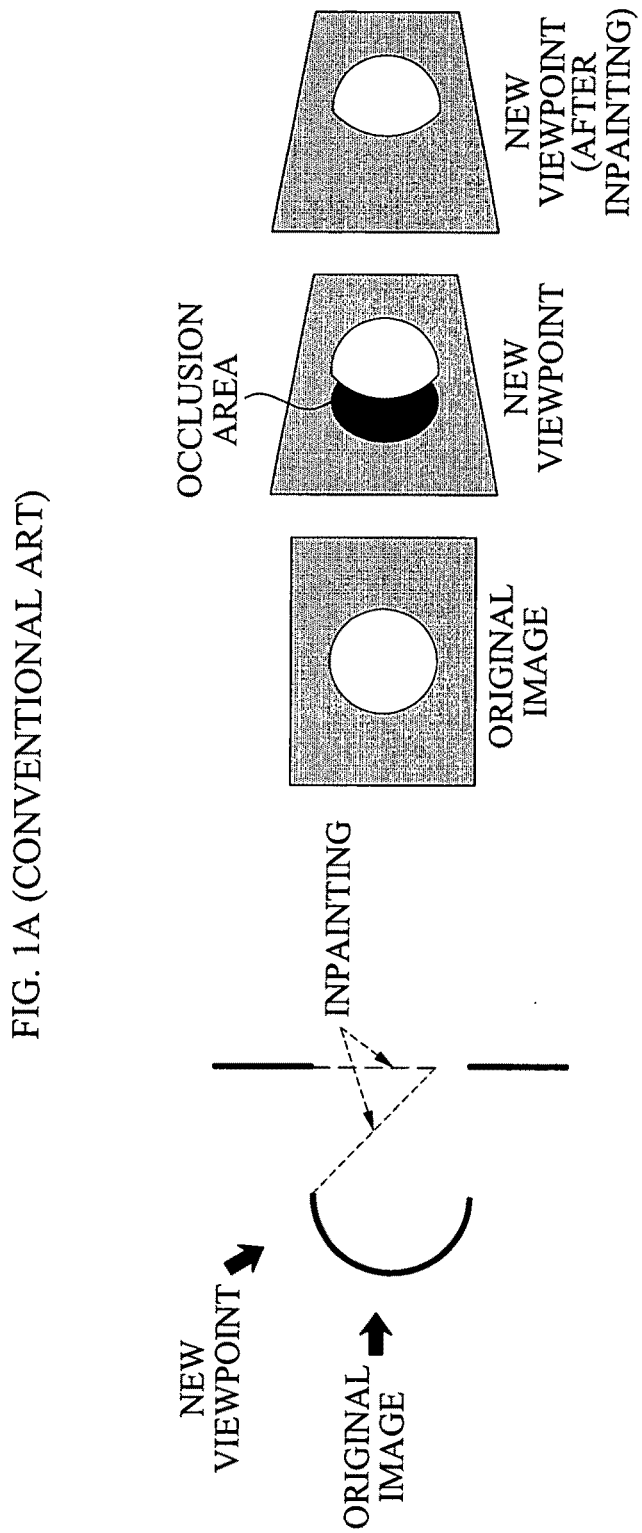

US 9,378,583 B2

APPARATUS AND METHOD FOR BIDIRECTIONALLY INPAINTING OCCLUSION AREA BASED ON PREDICTED VOLUME

CROSS-REFERENCE TO RELATED APPLICATIONS

This application claims the priority benefit of Korean Patent Application No. 10-2010-0063985, filed on Jul. 2, 2010, in the Korean Intellectual Property Office, the disclosure of which is incorporated herein by reference.

BACKGROUND

1. Field

One or more example embodiments relate to an apparatus and method for inpainting an occlusion area appearing when a virtual viewpoint image is generated.

2. Description of the Related Art

A depth image may monochromatically represent a distance between an object in three-dimensional (3D) space and a camera for capturing the object. The depth image is usually used in a 3D inpainting technology or a 3D warping technology, based on depth information and camera parameters.

A depth image and a color image of an object captured from a reference viewpoint are distinct from a depth image and a color image of an object captured from a virtual viewpoint. This is because when a camera capturing an object is moved, that is, when a viewpoint from which an object is viewed is changed, an area that was not shown prior to changing the viewpoint may now be seen from the changed viewpoint. Here, an area that is shown in a virtual viewpoint image, despite not being shown in a reference viewpoint image, may be referred to as an occlusion area.

Accordingly, there is a desire for a technology to inpaint an occlusion area to provide a more realistic 3D image.

SUMMARY

According to one or more example embodiments, an occlusion area may be inpainted bidirectionally using a foreground area and a background area in a virtual viewpoint image based on a predicted volume and thus, it is possible to improve a cardboard effect that occurs in a unidirectional inpainting scheme.

Additionally, according to one or more example embodiments, an occlusion area may be bidirectionally inpainted and thus, it is possible to accurately reflect 3D information of an object on an image having a wider view angle, for example a free view image, and to subjectively and objectively improve an image quality, when the image is generated.

Furthermore, according to one or more example embodiments, it is possible to provide a more dynamic 3D image at a virtual viewpoint, by predicting a 3D volume.

The foregoing and/or other aspects are achieved by providing a method of bidirectionally inpainting an occlusion area based on a predicted volume, the method including receiving an input of a depth image and a color image, the depth image having depth information for a first viewpoint, and the color image having color information for the first viewpoint, generating a virtual viewpoint image at a second viewpoint based on the depth image and the color image, separating the virtual viewpoint image into a foreground area and a background area, based on the depth information and direction information regarding a direction from the first viewpoint to the second viewpoint, predicting a three-dimensional (3D) volume of the foreground area, and inpainting an occlusion area bidirectionally using the foreground area and the background area, based on the predicted 3D volume, the occlusion area being included in the virtual viewpoint image.

The predicting may further include inpainting a volume to apply a value predicted by a volume prediction scheme to the predicted 3D volume, based on a value of 3D information of the foreground area.

The predicting may include predicting the 3D volume so that an occlusion area of a depth image input at the first viewpoint has a constant depth value corresponding to the foreground area.

The predicting may include predicting the 3D volume so that an occlusion area of a depth image input at the first viewpoint has a depth value of a shape reflected from the foreground area.

The predicting may include predicting the 3D volume based on a volumetric center-based scheme in an occlusion area of a depth image input at the first viewpoint, corresponding to the foreground area.

The predicting may include predicting the 3D volume based on a depth value of a model, set in advance, in an occlusion area of a depth image input at the first viewpoint.

The method may further include performing 3D warping of a depth image at the first viewpoint to the virtual viewpoint image at the second viewpoint, based on the predicted 3D volume.

The inpainting may include inpainting a first area of the occlusion area using the foreground area, and inpainting a second area of the occlusion area using the background area. Here, the first area may be predicted as a foreground area and the second area may be predicted as a background area based on the predicted 3D volume.

The inpainting may include comparing 3D information of peripheral pixels around a boundary of the occlusion area, and inpainting the occlusion area based on pixels that are determined to be similar to each other in the occlusion area.

The inpainting may include dividing the virtual viewpoint image into block images, comparing similarity between the block images, and inpainting the occlusion area based on block images that are determined to be similar to each other in the occlusion area.

The inpainting may include dividing the virtual viewpoint image into block images, comparing similarity between the block images, and inpainting the occlusion area based on pixels included in block images that are determined to be similar to each other in the occlusion area.

The foregoing and/or other aspects are achieved by providing an apparatus for bidirectionally inpainting an occlusion area based on a predicted volume, the apparatus including an input unit to receive an input of a depth image and a color image, the depth image having depth information for a first viewpoint, and the color image having color information for the first viewpoint, a virtual viewpoint image generator to generate a virtual viewpoint image at a second viewpoint based on the depth image and the color image, an area separation unit to separate the virtual viewpoint image into a foreground area and a background area, based on the depth information and direction information regarding a direction from the first viewpoint to the second viewpoint, a volume prediction unit to predict a 3D volume of the foreground area, and an occlusion area inpainting unit to inpaint an occlusion area bidirectionally using the foreground area and the background area, based on the predicted 3D volume, the occlusion area being included in the virtual viewpoint image.

The volume prediction unit may further include a volume inpainting unit to apply a value predicted by a volume prediction scheme to the predicted 3D volume, based on a value of 3D information of the foreground area.

The apparatus may further include a warping unit to perform 3D warping of a depth image at the first viewpoint to the virtual viewpoint image at the second viewpoint, based on the predicted 3D volume.

The occlusion area inpainting unit may inpaint a first area of the occlusion area using the foreground area, and may inpaint a second area of the occlusion area using the background area. Here, the first area may be predicted as a foreground area and the second area may be predicted as a background area based on the predicted 3D volume.

The occlusion area inpainting unit may compare 3D information of peripheral pixels around a boundary between the foreground area and the first area, and may inpaint the first area based on pixels that are determined to be similar to each other in the occlusion area. Additionally, the occlusion area inpainting unit may divide the background area into block background areas, may compare similarity between the block background areas, and may inpaint the second area based on block background areas that are determined to be similar to each other in the occlusion area.

The occlusion area inpainting unit may divide the foreground area into block foreground areas, may compare similarity between the block foreground areas, and may inpaint the first area based on block foreground areas that are determined to be similar to each other in the occlusion area. Additionally, the occlusion area inpainting unit may compare 3D information of peripheral pixels around a boundary between the background area and the second area, and may inpaint the second area based on pixels that are determined to be similar to each other in the occlusion area.

The occlusion area inpainting unit may compare 3D information of peripheral pixels around a boundary between the foreground area and the first area, and may inpaint the first area based on pixels that are determined to be similar to each other in the occlusion area. Additionally, the occlusion area inpainting unit may divide the background area into block background areas, may compare similarity between the block background areas, and may inpaint the second area based on pixels included in block background areas that are determined to be similar to each other in the occlusion area.

The occlusion area inpainting unit may divide the foreground area into block foreground areas, may compare similarity between the block foreground areas, and may inpaint the first area based on block foreground areas that are determined to be similar to each other in the occlusion area. Additionally, the occlusion area inpainting unit may divide the background area into block background areas, may compare similarity between the block background areas, and may inpaint the second area based on pixels included in block background areas that are determined to be similar to each other in the occlusion area.

The occlusion area inpainting unit may divide the foreground area into block foreground areas, may compare similarity between the block foreground areas, and may inpaint the first area based on pixels included in block foreground areas that are determined to be similar to each other in the occlusion area. Additionally, the occlusion area inpainting unit may compare 3D information of peripheral pixels around a boundary between the background area and the second area, and may inpaint the second area based on pixels that are determined to be similar to each other in the occlusion area.

The occlusion area inpainting unit may divide the foreground area into block foreground areas, may compare similarity between the block foreground areas, and may inpaint the first area based on pixels included in block foreground areas that are determined to be similar to each other in the occlusion area. Additionally, the occlusion area inpainting unit may divide the background area into block background areas, may compare similarity between the block background areas, and may inpaint the second area based on block background areas that are determined to be similar to each other in the occlusion area.

Additional aspects of embodiments will be set forth in part in the description which follows and, in part, will be apparent from the description, or may be learned by practice of the disclosure.

The foregoing and/or other aspects are achieved by providing a method of inpainting an occlusion area generated when depth information and color information of a first viewpoint is used to create a virtual viewpoint image. The method includes bidirectionally inpainting the occlusion area using a foreground area and a background area of the virtual viewpoint image based on a predicted three-dimensional (3D) volume of the foreground area.

The foregoing and/or other aspects are achieved by providing at least one non-transitory medium comprising computer readable code to control at least one processor to implement the method of inpainting an occlusion area.

The foregoing and/or other aspects are achieved by providing an apparatus inpainting an occlusion area. The apparatus includes a virtual viewpoint image generator to generate a virtual viewpoint image at a second viewpoint based on depth information and color information of a first viewpoint that is a reference viewpoint, an area separation unit to separate the virtual viewpoint image into a foreground area and a background area, based on the depth information and direction information regarding a direction from the first viewpoint to the second viewpoint, and an occlusion area inpainting unit to inpaint an occlusion area bidirectionally using the foreground area and the background area based on a predicted three-dimensional (3D) volume of the foreground area, the occlusion area being included within the virtual viewpoint image.

BRIEF DESCRIPTION OF THE DRAWINGS

These and/or other aspects will become apparent and more readily appreciated from the following description of embodiments, taken in conjunction with the accompanying drawings of which:

FIG. 1A illustrates a diagram of a conventional process of inpainting an occlusion area using only a background area;

DETAILED DESCRIPTION

Figure 1B:
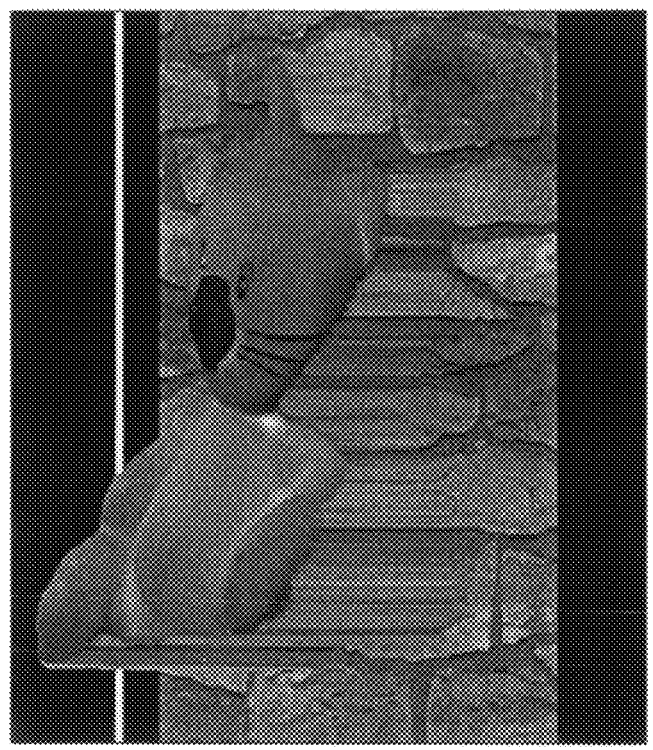
FIG. 1B illustrates a diagram of an effect occurring when the conventional process of FIG. 1A is applied.

Reference will now be made in detail to embodiments, examples of which are illustrated in the accompanying drawings, wherein like reference numerals refer to the like elements throughout. Embodiments are described below to explain the present disclosure by referring to the figures.

FIG. 1A illustrates a diagram of a conventional process of inpainting an occlusion area using only a background area.

A depth image refers to an image monochromatically representing a distance between an object in three-dimensional (3D) space and a camera for capturing the object. A color image refers to an image representing information on colors of an object for each pixel.

When a 3D image is generated at a new viewpoint based on a depth image and a color image that are acquired from a viewpoint of an original image, an area that is not shown in the original image may be viewed from the new viewpoint. The area is referred to as an occlusion area. The original image may be separated into a foreground image and a background image, based on the occlusion area.

A scheme of inpainting an occlusion area using only a background area may result in a small degradation in an image quality in the case of an image having a small occlusion area, for example a stereo image. However, when the scheme is used to inpaint an occlusion area of an image having a wider view angle, for example a multi-view image, 3D information of an object may be distorted, thereby decreasing an image quality.

Referring to FIG. 1A, when a camera captures a sphere, a depth image and a color image representing a hemisphere and a background may be acquired from a viewpoint of an original image. The acquired depth image and color image may be indicated by solid lines in FIG. 1A. Additionally, an occlusion area indicated by a dotted line in FIG. 1A may be viewed from a new viewpoint, despite not being shown in the original image. Here, when only a background area is used to inpaint the occlusion area at the new viewpoint, the occlusion area may be inpainted based on information regarding the background area, regardless of a shape of the sphere. Accordingly, the shape of the sphere may be distorted. The sphere of FIG. 1A appears to have a circular shape, however, actually represents a 3D sphere.

Referring to FIG. 1B, an occlusion area may be generated in a virtual image that is generated by changing a viewpoint of a cat doll. When the occlusion area is inpainted using only 3D information of a background area, 3D information of an object image may be distorted, so that the object image may be horizontally thinned, that is, a cardboard effect may occur. As described above, when inpainting an occlusion area using only a background area, there is a limitation to display of a 3D image based on an actual object.

Figure 2:
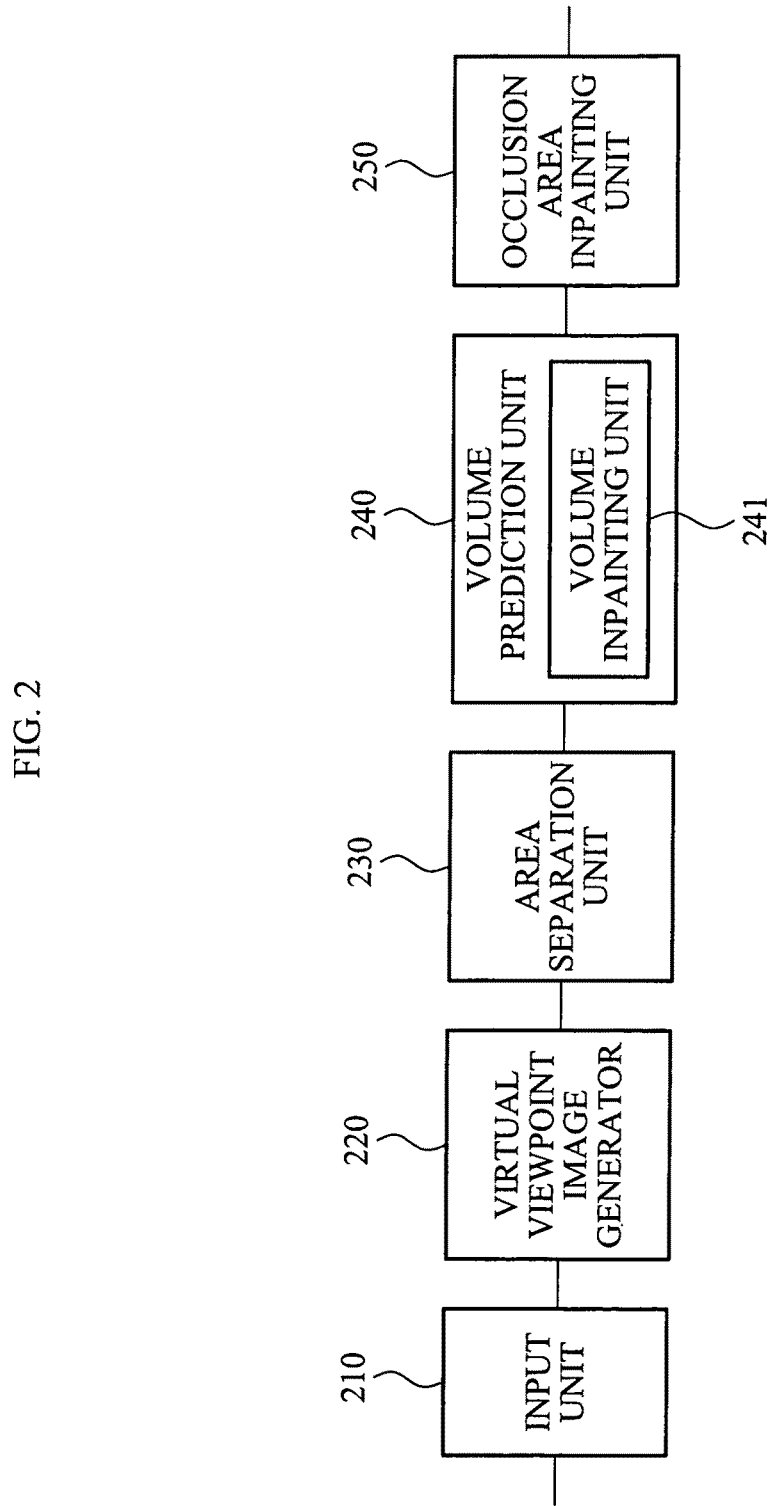
FIG. 2 illustrates a block diagram of an apparatus for bidirectionally inpainting an occlusion area based on a predicted volume according to example embodiments.

FIG. 2 illustrates a block diagram of an apparatus for bidirectionally inpainting an occlusion area based on a predicted volume according to example embodiments.

The apparatus of FIG. 2 may include, for example, an input unit 210, a virtual viewpoint image generator 220, an area separation unit 230, a volume prediction unit 240, and an occlusion area inpainting unit 250.

The input unit 210 may receive an input of a depth image and a color image. The depth image may have depth information for a first viewpoint, and the color image may have color information for the first viewpoint. The first viewpoint may be a viewpoint from which the depth image and the color image are captured by a camera based on a reference viewpoint. The depth information may include values based on distances from the camera to an object and a background that are to be captured, and may be represented for each pixel.

The virtual viewpoint image generator 220 may generate a virtual viewpoint image at a second viewpoint, based on the depth image and the color image captured at the first viewpoint. The second viewpoint may be a virtual viewpoint set at a different position from the reference viewpoint. When warping is performed based on the depth information and the color information, the virtual viewpoint image generator 220 may generate the virtual viewpoint image at the second viewpoint. Here, the warping briefly refers to a scheme of converting an image generated at the reference viewpoint into a virtual viewpoint image.

The area separation unit 230 may separate the virtual viewpoint image into a foreground area and a background area, based on the depth information and direction information. The direction information may include information regarding a shift direction from the first viewpoint to the second viewpoint. The virtual viewpoint image may include an occlusion area that is not shown in a first viewpoint image, because the virtual viewpoint image may be generated based on the first viewpoint image at the second viewpoint, that is, a virtual viewpoint. Additionally, the occlusion area may be relatively separated into a boundary corresponding to a foreground and a boundary corresponding to a background, based on the second viewpoint. The foreground area may be an area having a depth value less than a depth value of the occlusion area, and the back ground area may be an area having a depth value greater than a depth value of the occlusion area. The depth information may include a 3D coordinate value, and the direction information may include information regarding a shift direction from the first viewpoint to the second viewpoint.

The volume prediction unit 240 may predict a 3D volume of the foreground area in the virtual viewpoint image. Here, the predicted 3D volume may be used as a reference to inpaint an occlusion area bidirectionally using a foreground area and a background area. Here, "bidirectional inpainting" means an inpainting operation in a direction of a foreground and a direction of a background.

Specifically, the predicted 3D volume may be used as a reference to separate the occlusion area into a first area predicted as a foreground area, and a second area predicted as a background area. A volume prediction scheme may include, for example, a uniform rear scheme, a reflection scheme, a volumetric center based scheme, and a model based scheme. The volume prediction scheme will be further described with reference to FIG. 5. However, the volume prediction scheme is not limited to the above-described schemes, and may include a technology that may be easily derived from a technical field of the example embodiments by those skilled in the art.

Additionally, the volume prediction unit 240 may further include a volume inpainting unit 241 to apply a value predicted by the volume prediction scheme to the predicted 3D volume, based on a value of 3D information of the foreground area in the virtual viewpoint image. The volume inpainting unit 241 may convert depth information of the foreground area, for example a 3D coordinate value of the foreground area, based on the volume prediction scheme, and may apply the converted depth information to the predicted 3D volume. For example, when the uniform rear scheme is used as a volume prediction scheme, the volume inpainting unit 241 may apply a weight to a 3D coordinate value of the foreground area, may convert the 3D coordinate value, and may match the converted value to the predicted volume, so that the 3D coordinate value may have a constant depth value.

The occlusion area inpainting unit 250 may bidirectionally inpaint an occlusion area, using the foreground area and the background area, based on the 3D volume predicted by the volume prediction unit 240 and the color information received by the input unit 210. Here, the occlusion area may be included in the virtual viewpoint image generated at the second viewpoint, and may be separated into a first area predicted as a foreground area, and a second area predicted as a background area, based on the predicted 3D volume. The first area may indicate an area between the predicted 3D volume and the foreground area separated by the area separation unit 230. The second area may indicate an area between the predicted 3D volume and the background area separated by the area separation unit 230.

The occlusion area inpainting unit 250 may inpaint the first area based on depth information and color information regarding the foreground area. The occlusion area inpainting unit 250 may also inpaint the second area based on depth information and color information regarding the background area. A scheme of inpainting an occlusion area may include a comparing operation and a sampling operation, and may be divided, for example, into a point based scheme, a region based scheme, and a Non Local Means (NLM) scheme.

In the point based scheme, similarity between peripheral pixels around a pixel to be inpainted may be compared, and similar pixels among the pixels may be sampled, so that an occlusion area may be inpainted.

In the region based scheme, an area to be inpainted may be divided into blocks, similarity between the blocks may be compared, and similar blocks among the blocks may be sampled, so that an occlusion area may be inpainted.

In the NLM scheme, an area to be inpainted may be divided into blocks, and similarity between the blocks may be compared, and similar blocks among the blocks may be sampled for each pixel, so that an occlusion area may be inpainted. Here, the similarity may include a similarity of a gradient, a similarity of a depth value, and a similarity of color.

Accordingly, the occlusion area inpainting unit 250 may inpaint the occlusion area using various schemes as described above.

In an example, the occlusion area inpainting unit 250 may inpaint the first area of the occlusion area using the point based scheme, based on a boundary between the first area and the foreground area, and may inpaint the second area of the occlusion area using the region based scheme. Specifically, the occlusion area inpainting unit 250 may compare 3D information of peripheral pixels around the boundary the first area and the foreground area, and may inpaint the first area based on pixels that are determined to be similar to each other in the occlusion area. Additionally, the occlusion area inpainting unit 250 may divide the background area into block background areas, may compare similarity between the block background areas, and may inpaint the second area based on block background areas that are determined to be similar to each other in the occlusion area.

In another example, the occlusion area inpainting unit 250 may inpaint the first area of the occlusion area using the region based scheme, and may inpaint the second area of the occlusion area using the point based scheme, based on a boundary between the second area and the background area. Specifically, the occlusion area inpainting unit 250 may divide the foreground area into block foreground areas, may compare similarity between the block foreground areas, and may inpaint the first area based on block foreground areas that are determined to be similar to each other in the occlusion area. Additionally, the occlusion area inpainting unit 250 may compare 3D information of peripheral pixels around the boundary between the second area and the background area, and may inpaint the second area based on pixels that are determined to be similar to each other in the occlusion area.

In still another example, the occlusion area inpainting unit 250 may inpaint the first area of the occlusion area using the point based scheme, based on a boundary between the first area and the foreground area, and may inpaint the second area of the occlusion area using the NLM scheme. Specifically, the occlusion area inpainting unit 250 may compare 3D information of peripheral pixels around the boundary between the first area and the foreground area, and may inpaint the first area based on pixels that are determined to be similar to each other in the occlusion area. Additionally, the occlusion area inpainting unit 250 may divide the background area into block background areas, may compare similarity between the block background areas, may perform sampling of pixels included in block background areas that are determined to be similar to each other in the occlusion area, and may inpaint the second area.

In a further example, the occlusion area inpainting unit 250 may inpaint the first area of the occlusion area using the region based scheme, and may inpaint the second area of the occlusion area using the NLM scheme. Specifically, the occlusion area inpainting unit 250 may divide the foreground area into block foreground areas, may compare similarity between the block foreground areas, and may inpaint the first area based on block foreground areas that are determined to be similar to each other in the occlusion area. Additionally, the occlusion area inpainting unit 250 may divide the background area into block background areas, may compare similarity between the block background areas, may perform sampling of pixels included in block background areas that are determined to be similar to each other in the occlusion area, and may inpaint the second area.

In a further example, the occlusion area inpainting unit 250 may inpaint the first area of the occlusion area using the NLM scheme, and may inpaint the second area of the occlusion area using the point based scheme. Specifically, the occlusion area inpainting unit 250 may divide the foreground area into block foreground areas, may compare similarity between the block foreground areas, may perform sampling of pixels included in block foreground areas that are determined to be similar to each other in the occlusion area, and may inpaint the first area. Additionally, the occlusion area inpainting unit 250 may compare 3D information of peripheral pixels around a boundary between the second area and the background area, and may inpaint the second area based on pixels that are determined to be similar to each other in the occlusion area.

In a further example, the occlusion area inpainting unit 250 may inpaint the first area of the occlusion area using the NLM scheme, and may inpaint the second area of the occlusion area using the region based scheme. Specifically, the occlusion area inpainting unit 250 may divide the foreground area into block foreground areas, may compare similarity between the block foreground areas, may perform sampling of pixels included in block foreground areas that are determined to be similar to each other in the occlusion area, and may inpaint the first area. Additionally, the occlusion area inpainting unit 250 may divide the background area into block background areas, may compare similarity between the block background areas, and may inpaint the second area based on block background areas that are determined to be similar to each other in the occlusion area.

According to another example embodiment, an apparatus for bidirectionally inpainting an occlusion area based on a predicted volume may further include a warping unit (not shown) to perform 3D warping of the depth image at the first viewpoint to the virtual viewpoint image at the second viewpoint based on the 3D volume predicted by the volume prediction unit 240. The warping unit may convert a reference viewpoint image into a virtual viewpoint image, based on the predicted 3D volume.

Figure 3:
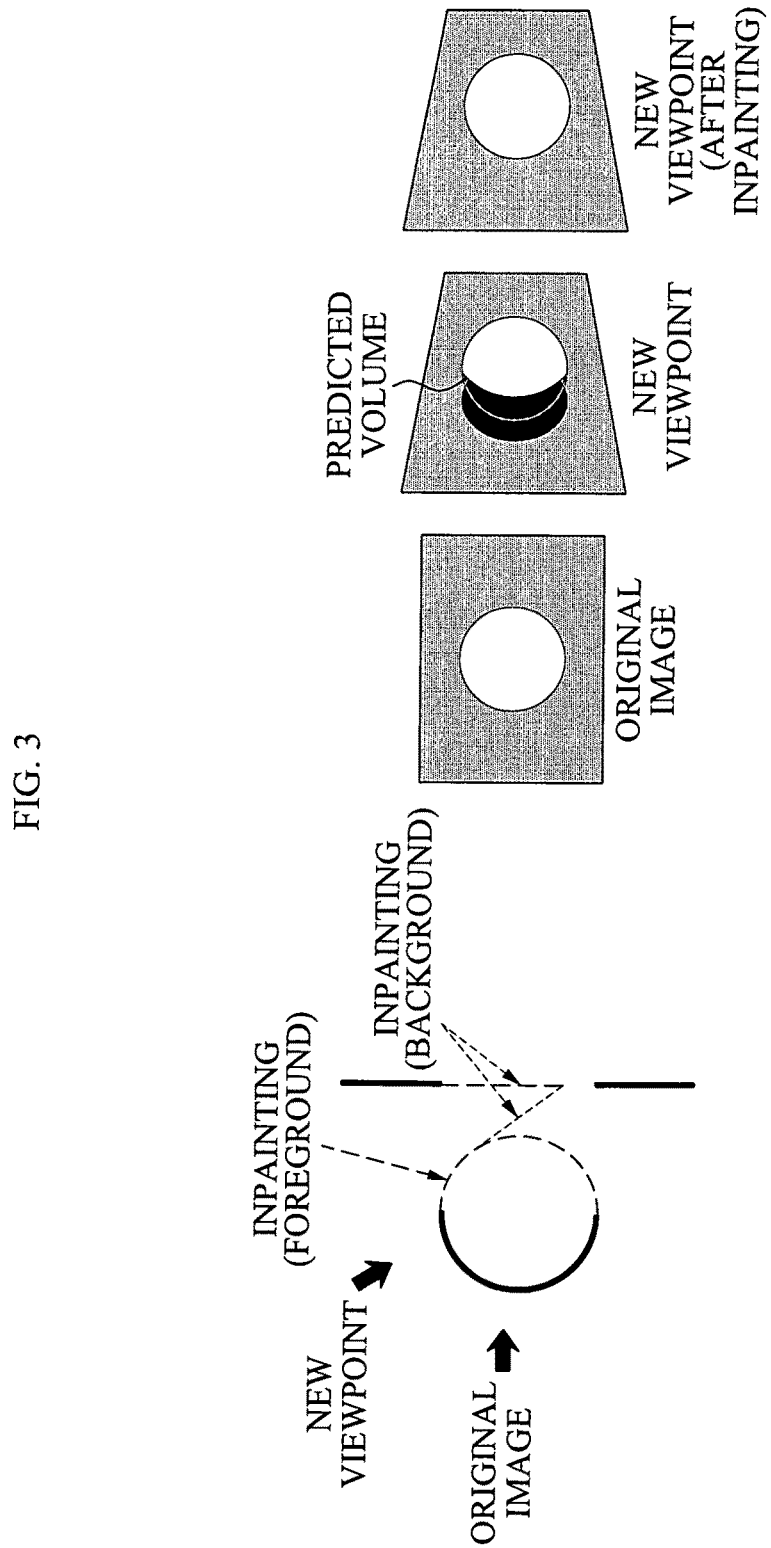
FIG. 3 illustrates a diagram of a process of inpainting an occlusion area using a foreground area and a background area according to example embodiments.

FIG. 3 illustrates a diagram of a process of inpainting an occlusion area using a foreground area and a background area according to example embodiments.

Referring to FIG. 3, an apparatus for bidirectionally inpainting an occlusion area based on a predicted volume according to an example embodiment may predict a 3D volume for an occlusion area that is not shown in the original image, by using the foreground area. Here, the predicted volume may be indicated by a circular dotted line. The apparatus may inpaint a portion of the occlusion area corresponding to an inner side of the circular dotted line using the foreground area, and may inpaint another portion corresponding to an outer side of the circular dotted line using the background area. A virtual image inpainted bidirectionally using both the foreground area and the background area through the volume prediction may have a spherical shape to reflect an actual object even in a new viewpoint, and may differ from the inpainted image of FIG. 1A.

Figure 4:
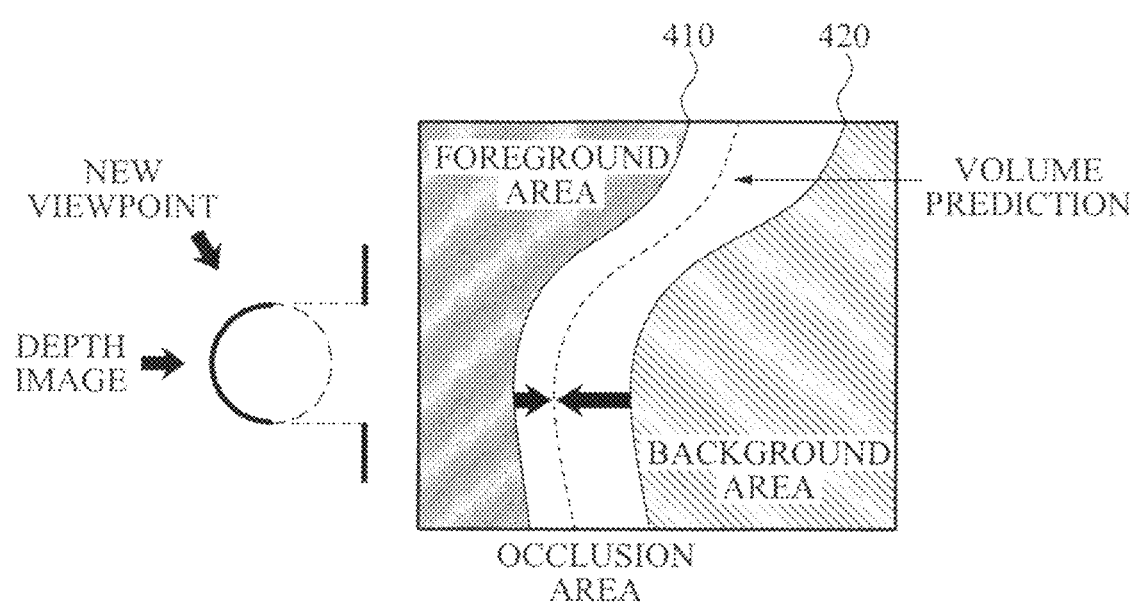
FIG. 4 illustrates a diagram of a foreground area and a background area in an image captured from a new viewpoint according to example embodiments.

FIG. 4 illustrates a diagram of a foreground area and a background area in an image captured from a new viewpoint according to example embodiments.

To predict a volume based on a foreground area, a virtual viewpoint image generated at a new viewpoint may be separated into a foreground area and a background area. The foreground area and the background area may be classified by associating object depth information acquired from an original image with direction information for the new viewpoint.

A 3D warping may be performed to search for an occlusion area from the virtual viewpoint image generated at the new viewpoint. An area having a depth value less than a depth value of the occlusion area may be referred to as a foreground area, and an area having a depth value greater than a depth value of the occlusion area may be referred to as a background area.

The occlusion area and the foreground area may be classified by a boundary 410 between the occlusion area and the foreground area. Additionally, the occlusion area and the background area may be classified by a boundary 420 between the occlusion area and the background area.

A 3D volume predicted based on the foreground area may be used as a reference to separate the occlusion area into the first area and the second area. Here, the first area and the second area in the occlusion area may be respectively inpainted using the foreground area and the background area.

Figure 5:
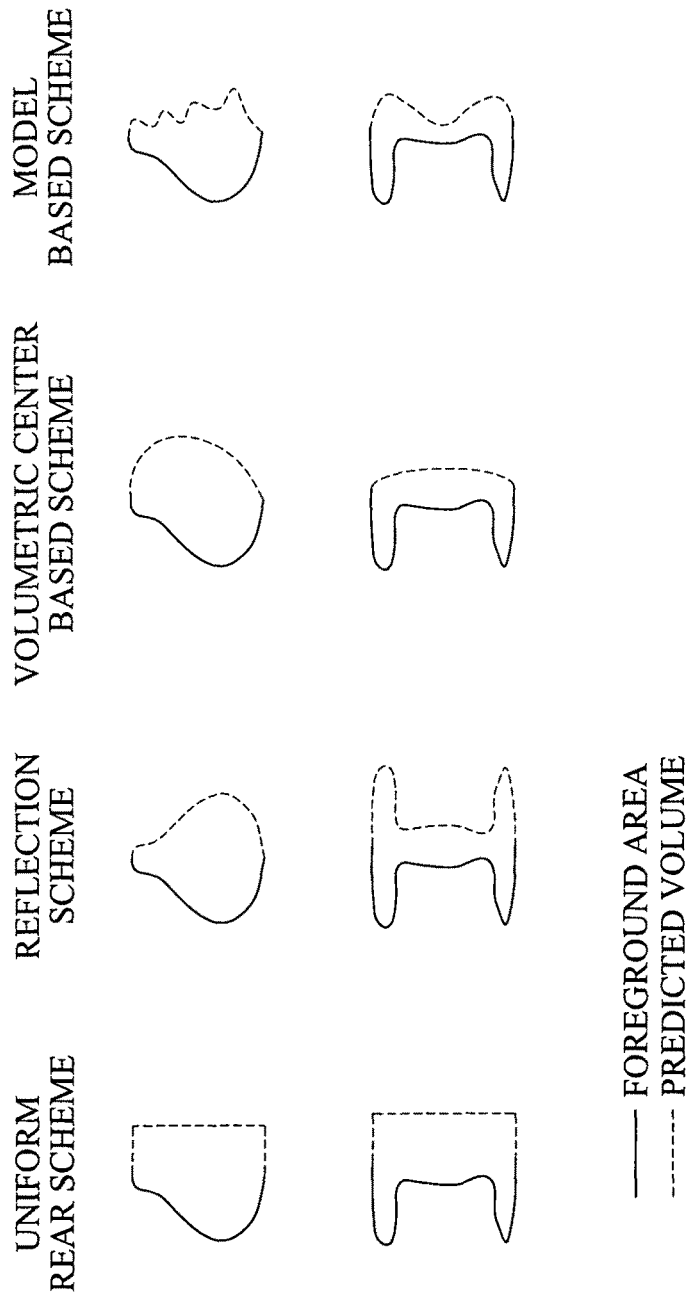
FIG. 5 illustrates a diagram of examples of a volume prediction scheme according to example embodiments.

FIG. 5 illustrates a diagram of examples of a volume prediction scheme according to example embodiments. In FIG. 5, each solid line indicates a foreground area, and each dotted line indicates a predicted volume.

The volume prediction scheme may include, for example, a uniform rear scheme, a reflection scheme, a volumetric center based scheme, and a model based scheme.

The uniform rear scheme may be used to predict a volume so that an occlusion area that is not viewed from a reference viewpoint may have a constant depth value, regardless of depth information of a foreground area. Referring to FIG. 5, a 3D volume may be predicted so that both two objects may have constant depth values, regardless of foreground areas indicated by solid lines.

The reflection scheme may be used to predict a volume so that an occlusion area may have a depth value of a shape reflected from the foreground area. Referring to FIG. 5, a 3D volume of an object may be predicted so that the object may have a symmetrical shape.

The volumetric center based scheme may be used to estimate a center of a sphere or oval corresponding to a foreground area using three points based on the foreground area, and to predict a 3D volume. Referring to FIG. 5, when a shape of the foreground area is changed, available three points may also be changed based on the foreground area. Accordingly, the center of the sphere or oval to be estimated may also be changed and thus, different 3D volumes may be predicted.

The model based may be used to predict a volume using 3D information on an object, namely a model, set in advance, since the 3D information is already given. Referring to FIG. 5, a 3D volume may be predicted based on information regarding a basic shape of an object.

Figure 6:
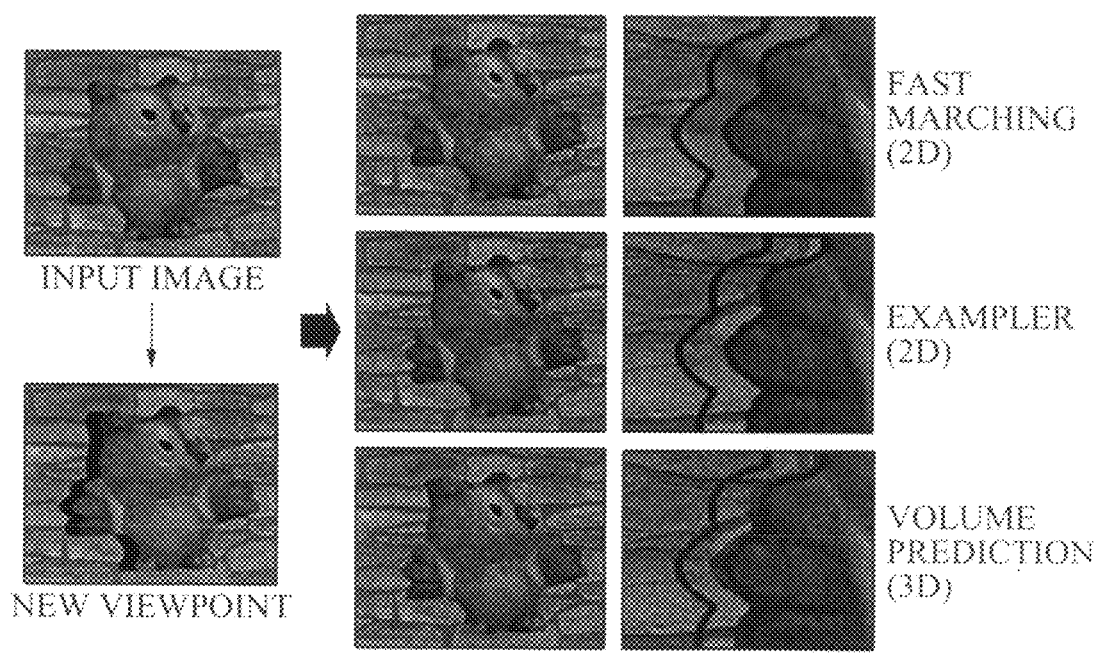
FIG. 6 illustrates a diagram of an example of inpainting an occlusion area bidirectionally using a foreground and a background according to example embodiments.

FIG. 6 illustrates a diagram of an example of inpainting an occlusion area bidirectionally using a foreground and a background according to example embodiments.

Specifically, FIG. 6 illustrates a result obtained by unidirectionally inpainting an occlusion area using only a background area, and illustrates a result obtained by bidirectionally inpainting an occlusion area based on a predicted volume according to example embodiments. In FIG. 6, an input image may be converted into a virtual viewpoint image captured from a new viewpoint through a 3D warping operation. Here, the virtual viewpoint image may include an occlusion area.

In FIG. 6, "fast marching" refers to a point-based inpainting scheme, and "exampler" refers to a region-based inpainting scheme. The fast marching and the exampler may be applied to the input image to inpaint an occlusion area of the input image unidirectionally using only the background area, as shown in FIG. 6. Since only the background area is used in both the fast marching and the exampler, a cardboard phenomenon may occur so that an inpainted object may be horizontally thinned.

When an object image is inpainted using both the foreground area and the background area based on the predicted 3D volume, the cardboard phenomenon may be improved, compared to the fast marching and the exampler.

Figure 7:
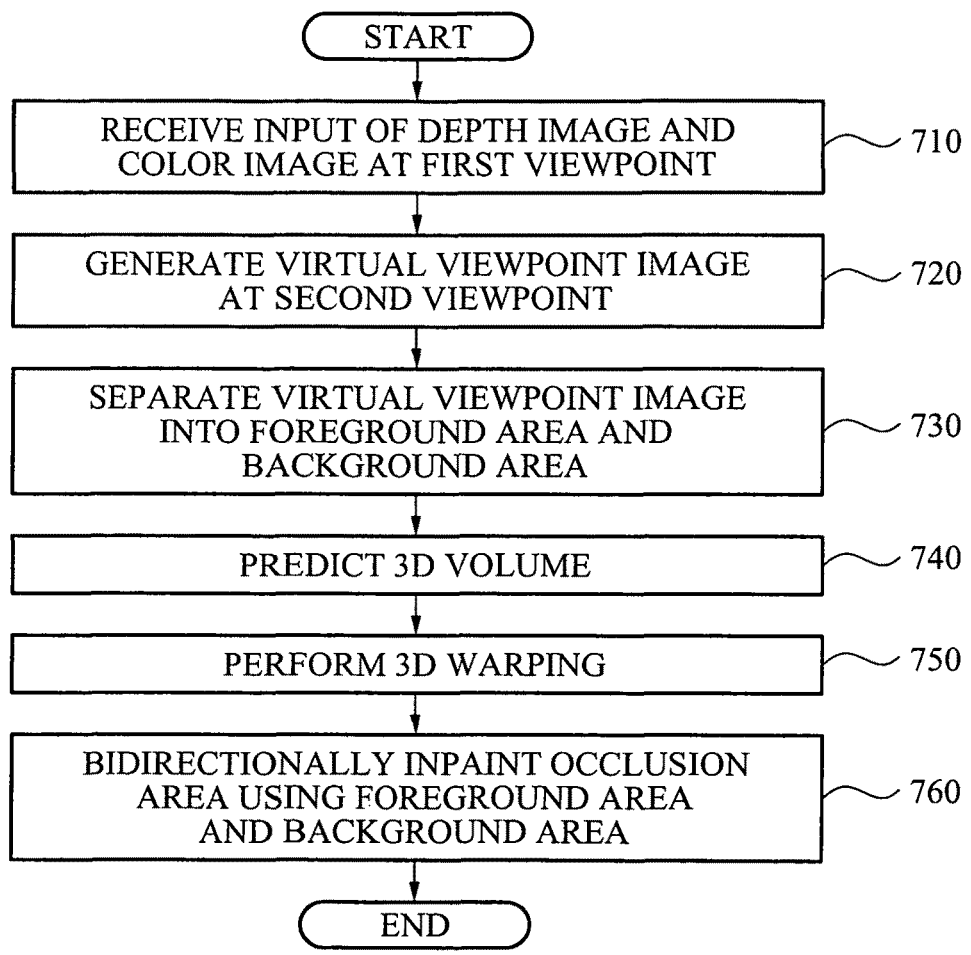
FIG. 7 illustrates a flowchart of a method of bidirectionally inpainting an occlusion area based on a predicted volume according to example embodiments.

FIG. 7 illustrates a flowchart of a method of bidirectionally inpainting an occlusion area based on a predicted volume according to example embodiments.

In operation 710, an apparatus for bidirectionally inpainting an occlusion area based on a predicted volume may receive an input of a depth image and a color image. The depth image may have depth information for a first viewpoint, and the color image may have color information for the first viewpoint. The first viewpoint is a viewpoint from which the depth image and the color image are captured by a camera based on a reference viewpoint.

In operation 720, the apparatus may generate a virtual viewpoint image at a second viewpoint, based on the depth image and the color image. The second viewpoint may be a virtual viewpoint set at a different position from the reference viewpoint.

In operation 730, the apparatus may separate the virtual viewpoint image into a foreground area and a background area, based on the depth information and direction information regarding a direction from the first viewpoint to the second viewpoint.

In operation 740, the apparatus may predict a 3D volume of the foreground area in the virtual viewpoint image. Additionally, the apparatus may apply a value predicted by a volume prediction scheme to the predicted 3D volume, based on a value of 3D information of the foreground area. Here, the volume prediction scheme may include, for example, a uniform rear scheme, a reflection scheme, a volumetric center based scheme, and a model based scheme.

Specifically, the apparatus may predict the volume so that an occlusion area of a depth image input at the first viewpoint may have a constant depth value corresponding to the foreground area. Additionally, the apparatus may predict the volume so that the occlusion area of the depth image input at the first viewpoint may have a depth value of a shape reflected from the foreground area. Furthermore, the apparatus may predict the volume based on the volumetric center-based scheme in the occlusion area of the depth image input at the first viewpoint, corresponding to the foreground area. Moreover, the apparatus may predict the volume based on a depth value of a model, set in advance, in the occlusion area of the depth image input at the first viewpoint.

In operation 750, the apparatus may perform 3D warping of a depth image at the first viewpoint to the virtual viewpoint image at the second viewpoint, based on the predicted 3D volume. In other words, the apparatus may convert a reference viewpoint image into a virtual viewpoint image, based on the predicted 3D volume.

In operation 760, the apparatus may bidirectionally inpaint an occlusion area included in the virtual viewpoint image, using the foreground area and the background area, based on the predicted 3D volume. Here, the occlusion area may be separated into a first area predicted as a foreground area, and a second area predicted as a background area, based on the predicted 3D volume. The apparatus may inpaint the first area using the foreground area, and may inpaint the second area using the background area. Additionally, a scheme of inpainting an occlusion area may include, for example, a point based scheme, a region based scheme, and an NLM scheme.

Specifically, the apparatus may compare 3D information of peripheral pixels around a boundary of the occlusion area, and may inpaint the occlusion area based on pixels that are determined to be similar to each other in the occlusion area. Additionally, the apparatus may divide the virtual viewpoint image into block images, may compare similarity between the block images, and may inpaint the occlusion area based on block images that are determined to be similar to each other in the occlusion area. Furthermore, the apparatus may divide the virtual viewpoint image into block images, may compare similarity between the block images, may perform sampling of pixels included in block images that are determined to be similar to each other in the occlusion area, and may inpaint the occlusion area.

Figure 8:
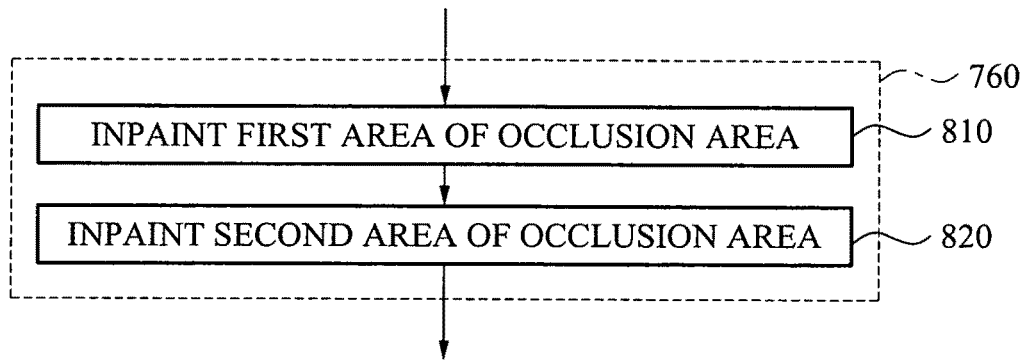
FIG. 8 further illustrates a flowchart of the method of FIG. 7.

FIG. 8 illustrates a flowchart of operation 760 of the method of FIG. 7.

In operation 810, the apparatus may inpaint the first area of the occlusion area using the foreground area. Here, the first area of the occlusion area may be determined based on the predicted 3D volume, and a scheme of inpainting an occlusion area using a foreground area may include, for example, a point based scheme, a region based scheme, and an NLM scheme.

In operation 820, the apparatus may inpaint the second area of the occlusion area using the background area. Here, the second area of the occlusion area may be determined based on the predicted 3D volume, and a scheme of inpainting an occlusion area using a background area may include, for example, a point based scheme, a region based scheme, and an NLM scheme.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

The described hardware may also be configured to act as one or more software modules in order to perform the operations of the above-described embodiments. The methods according to the above-described example embodiments may be executed on a general purpose computer or processor or may be executed on a particular machine such as the apparatuses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of inpainting an occlusion area, the method comprising:
   receiving an input of a depth image and a color image, the depth image having depth information for a first viewpoint, and the color image having color information for the first viewpoint;
   generating a virtual viewpoint image at a second viewpoint based on the depth image and the color image;
   separating the virtual viewpoint image into a foreground area and a background area, based on the depth information and direction information regarding a direction from the first viewpoint to the second viewpoint;
   predicting a three-dimensional (3D) volume of the foreground area in the occlusion area; and
   bidirectionally inpainting the occlusion area using the foreground area and the background area, based on the predicted 3D volume, the occlusion area being included in the virtual viewpoint image at the second viewpoint,
   wherein a shape of the predicted 3D volume of the foreground area in the inpainted virtual viewpoint image includes a different shape from a foreground area of the input.

2. The method of claim 1, wherein the predicting further comprises:
   inpainting a volume to apply a value predicted by a volume prediction scheme to the predicted 3D volume, based on a value of 3D information of the foreground area.

3. The method of claim 1, wherein the predicting comprises predicting the 3D volume so that an occlusion area of a depth image input at the first viewpoint has a constant depth value corresponding to the foreground area.

4. The method of claim 1, wherein the predicting comprises predicting the 3D volume so that an occlusion area of a depth image input at the first viewpoint has a depth value of a shape reflected from the foreground area.

5. The method of claim 1, wherein the predicting comprises predicting the 3D volume based on a depth value of a model, set in advance, in an occlusion area of a depth image input at the first viewpoint.

6. The method of claim 1, further comprising:
   performing 3D warping of a depth image at the first viewpoint to the virtual viewpoint image at the second viewpoint, based on the predicted 3D volume.

7. The method of claim 1, wherein the inpainting comprises inpainting a first area of the occlusion area using the foreground area, and inpainting a second area of the occlusion area using the background area, the first area being predicted as a foreground area and the second area being predicted as a background area based on the predicted 3D volume.

8. The method of claim 1, wherein the inpainting comprises comparing 3D information of peripheral pixels around a boundary of the occlusion area, and inpainting the occlusion area based on pixels that are determined to be similar to each other in the occlusion area.

9. The method of claim 1, wherein the inpainting comprises dividing the virtual viewpoint image into block images, comparing similarity between the block images, and inpainting the occlusion area based on block images that are determined to be similar to each other in the occlusion area.

10. The method of claim 1, wherein the inpainting comprises dividing the virtual viewpoint image into block images, comparing similarity between the block images, and inpainting the occlusion area based on pixels comprised in block images that are determined to be similar to each other in the occlusion area.

11. The method of claim 1, wherein the predicting comprises predicting the 3D volume based on a volumetric center-based scheme in an occlusion area of a depth image input at the first viewpoint, corresponding to the foreground area.

12. At least one non-transitory medium comprising computer readable code to control at least one processor to implement a method of inpainting an occlusion area, the method comprising:
receiving an input of a depth image and a color image, the depth image having depth information for a first viewpoint, and the color image having color information for the first viewpoint;
generating a virtual viewpoint image at a second viewpoint based on the depth image and the color image;
separating the virtual viewpoint image into a foreground area and a background area, based on the depth information and direction information regarding a direction from the first viewpoint to the second viewpoint;
predicting a three-dimensional (3D) volume of the foreground area in the occlusion area; and
bidirectionally inpainting the occlusion area using the foreground area and the background area, based on the predicted 3D volume, the occlusion area being included in the virtual viewpoint image at the second viewpoint,
wherein a shape of the predicted 3D volume of the foreground area in the inpainted virtual viewpoint image includes a different shape from a foreground area of the input.

13. An apparatus for inpainting an occlusion area, the apparatus comprising:
at least one processor configured to,
receive an input of a depth image and a color image, the depth image having depth information for a first viewpoint, and the color image having color information for the first viewpoint,
generate a virtual viewpoint image at a second viewpoint based on the depth image and the color image,
separate the virtual viewpoint image into a foreground area and a background area, based on the depth information and direction information regarding a direction from the first viewpoint to the second viewpoint,
predict a three-dimensional (3D) volume of the foreground area in the occlusion area, and
bidirectionally inpaint the occlusion area using the foreground area and the background area, based on the predicted 3D volume, the occlusion area being included in the virtual viewpoint image at the second viewpoint,
wherein a shape of the predicted 3D volume of the foreground area in the inpainted virtual viewpoint image includes a different shape from a foreground area of the input.

14. The apparatus of claim 13, wherein the at least one processor is further configured to apply a value predicted by a volume prediction scheme to the predicted 3D volume, based on a value of 3D information of the foreground area.

15. The apparatus of claim 13, wherein the at least one processor is further configured to perform 3D warping of a depth image at the first viewpoint to the virtual viewpoint image at the second viewpoint, based on the predicted 3D volume.

16. The apparatus of claim 13, wherein the at least one processor is further configured to inpaint a first area of the occlusion area using the foreground area, and inpaint a second area of the occlusion area using the background area, the first area being predicted as a foreground area and the second area being predicted as a background area based on the predicted 3D volume.

17. The apparatus of claim 15, wherein the at least one processor is further configured to,
compare 3D information of peripheral pixels around a boundary between the foreground area and the first area,
inpaint the first area based on pixels that are determined to be similar to each other in the occlusion area,
divide the background area into block background areas,
compare similarity between the block background areas, and
inpaint the second area based on block background areas that are determined to be similar to each other in the occlusion area.

18. The apparatus of claim 16, wherein the at least one processor is further configured to,
divide the foreground area into block foreground areas,
compare similarity between the block foreground areas,
inpaint the first area based on block foreground areas that are determined to be similar to each other in the occlusion area,
compare 3D information of peripheral pixels around a boundary between the background area and the second area, and
inpaint the second area based on pixels that are determined to be similar to each other in the occlusion area.

19. The apparatus of claim 15, wherein the at least one processor is further configured to,
compare 3D information of peripheral pixels around a boundary between the foreground area and the first area,
inpaint the first area based on pixels that are determined to be similar to each other in the occlusion area,
divide the background area into block background areas,
compare similarity between the block background areas, and
inpaint the second area based on pixels comprised in block background areas that are determined to be similar to each other in the occlusion area.

20. The apparatus of claim 15, wherein the at least one processor is further configured to,
divide the foreground area into block foreground areas,
compare similarity between the block foreground areas,
inpaint the first area based on block foreground areas that are determined to be similar to each other in the occlusion area,
divide the background area into block background areas,
compare similarity between the block background areas, and
inpaint the second area based on pixels comprised in block background areas that are determined to be similar to each other in the occlusion area.

21. The apparatus of claim 15, wherein the at least one processor is further configured to, divide the foreground area into block foreground areas,
compare similarity between the block foreground areas,
inpaint the first area based on pixels comprised in block foreground areas that are determined to be similar to each other in the occlusion area,
compare 3D information of peripheral pixels around a boundary between the background area and the second area, and
inpaint the second area based on pixels that are determined to be similar to each other in the occlusion area.

22. The apparatus of claim 15, wherein the at least one processor is further configured to,
divide the foreground area into block foreground areas,
compare similarity between the block foreground areas,
inpaint the first area based on pixels comprised in block foreground areas that are determined to be similar to each other in the occlusion area,
divide the background area into block background areas,
compare similarity between the block background areas, and
inpaint the second area based on block background areas that are determined to be similar to each other in the occlusion area.

23. A method of inpainting an occlusion area generated when depth information and color information of a first viewpoint are used to create a virtual viewpoint image at a second viewpoint, the method comprising:
bidirectionally inpainting the occlusion area using a foreground area and a background area of the virtual viewpoint image based on a predicted three-dimensional (3D) volume of the foreground area in the occlusion area,
wherein a shape of the predicted 3D volume of the foreground area in the inpainted virtual viewpoint image includes a different shape from a foreground area of the first viewpoint.

24. The method of claim 23, wherein the occlusion area is included in the virtual viewpoint image.

25. The method of claim 23, wherein the bidirectional inpainting comprises inpainting a first area of the occlusion area using the foreground area, and inpainting a second area of the occlusion area using the background area, the first area being predicted as a foreground area and the second area being predicted as a background area based on the predicted 3D volume.

26. At least one non-transitory medium comprising computer readable code to control at least one processor to implement a method of inpainting an occlusion area generated when depth information and color information of a first viewpoint are used to create a virtual viewpoint image at a second viewpoint, the method comprising:
bidirectionally inpainting the occlusion area using a foreground area and a background area of the virtual viewpoint image based on a predicted three-dimensional (3D) volume of the foreground area in the occlusion area,
wherein a shape of the predicted 3D volume of the foreground area in the inpainted virtual viewpoint image includes a different shape from a foreground area of the first viewpoint.

27. An apparatus inpainting an occlusion area, the apparatus comprising:
a virtual viewpoint image generator configured to generate a virtual viewpoint image at a second viewpoint based on depth information and color information of a first viewpoint that is a reference viewpoint;
an area separation unit configured to separate the virtual viewpoint image into a foreground area and a background area, based on the depth information and direction information regarding a direction from the first viewpoint to the second viewpoint; and
an occlusion area inpainting unit configured to bidirectionally inpaint an occlusion area using the foreground area and the background area based on a predicted three-dimensional (3D) volume of the foreground area in the occlusion area, the occlusion area being included within the virtual viewpoint image,
wherein a shape of the predicted 3D volume of the foreground area in the inpainted virtual viewpoint image includes a different shape from a foreground area of the first viewpoint.

28. The apparatus of claim 27, wherein the occlusion area inpainting unit is further configured to bidirectionally inpaint in a direction of the foreground and in a direction of the background.

29. The apparatus of claim 27, wherein the occlusion area inpainting unit is further configured to inpaint a first area of the occlusion area using the foreground area, and inpaint a second area of the occlusion area using the background area, the first area being predicted as a foreground area and the second area being predicted as a background area based on the predicted 3D volume.

30. The apparatus of claim 29, wherein the occlusion area inpainting unit is further configured to inpaint the first area of the occlusion area using a point based scheme, based on a boundary between the first area and the foreground area, and inpaint the second area of the occlusion area using a region based scheme.

* * * * *